US 6,497,960 B1
United States Patent
Kobayashi et al.

(10) Patent No.: US 6,497,960 B1
(45) Date of Patent: Dec. 24, 2002

(54) RESIN COMPOSITIONS FOR SKIN MEMBERS AND LAMINATES THEREOF

(76) Inventors: Kyoko Kobayashi, c/o Mitsui Chemicals, Inc., 3, Chigusa-Kaigan, Ichihara-shi, Chiba 299-0108 (JP); Masato Karaiwa, c/o Mitsui Chemicals, Inc., 3, Chigusa-Kaigan, Ichihara-shi, Chiba 299-0108 (JP); Kunihiko Mizumoto, c/o Mitsui Chemicals, Inc., 3, Chigusa-Kaigan, Ichihara-shi, Chiba 299-0108 (JP); Akira Uchiyama, c/o Mitsui Chemicals, Inc., 3, Chigusa-Kaigan, Ichihara-shi, Chiba 299-0108 (JP)

( * ) Notice: Subject to any disclaimer, the term of this patent is extended or adjusted under 35 U.S.C. 154(b) by 0 days.

(21) Appl. No.: 09/357,336

(22) Filed: Jul. 20, 1999

(30) Foreign Application Priority Data

Jul. 21, 1998 (JP) ............................. 10-205066
Jul. 24, 1998 (JP) ............................. 10-209099

(51) Int. Cl.$^7$ ..................... B32B 25/08; C08K 5/5415
(52) U.S. Cl. ..................... 428/421; 428/422; 428/451; 428/517; 428/521; 524/267; 524/268; 524/269; 525/101; 525/104; 525/105; 525/106; 525/199
(58) Field of Search ................ 524/267, 268, 524/269; 428/31, 121, 122, 451, 517, 521, 421, 422; 525/101, 104, 105, 106, 199

(56) References Cited

U.S. PATENT DOCUMENTS

| 4,808,643 A | 2/1989 | Lemoine et al. ............... 524/87 |
| 5,548,028 A | * 8/1996 | Tabb .......................... 525/194 |
| 6,146,739 A | * 11/2000 | Itoh et al. ................... 428/122 |

FOREIGN PATENT DOCUMENTS

| EP | 0508464 A | 10/1992 |
| EP | 0510936 A | 10/1992 |
| EP | 0860314 A | 8/1998 |
| WO | WO 9416016 | 7/1994 |
| WO | WO 9810724 | 3/1998 |

OTHER PUBLICATIONS

Japanese Patent Laid Open Publication No. 176408/1997, Published Jul. 8, 1997 (Abstract).

* cited by examiner

Primary Examiner—D. S. Nakarani

(57) ABSTRACT

The resin composition for a skin member according to the present invention comprises a completely or partially crosslinked olefin thermoplastic elastomer (A) in an amount of 100 parts by weight, an organopolysiloxane (B) having a viscosity (JIS K2283, 25° C.) of not less than $1\times10^6$ cSt, preferably $1\times10^6$ to $1\times10^8$ cSt in an amount of 2 to 20 parts by weight, an organopolysiloxane (C) having a viscosity (JIS K2283, 25° C.) of not less than 10 cSt and less than $1\times10^6$ cSt in an amount of 0.5 to 5 parts by weight, and optionally, a polyolefin resin (D) in an amount of 5 to 150 parts by weight and/or a fluoropolymer (E) in an amount of 0.5 to 10 parts by weight. The other resin composition for a skin member according to the invention comprises a completely or partially crosslinked olefin thermoplastic elastomer (A) in an amount of 100 parts by weight, a fluoropolymer (E) in an amount of 0.5 to 10 parts by weight, and optionally, a polyolefin resin (D) in an amount of 5 to 150 parts by weight. The laminate according to the invention is formed by laminating a skin member comprising any of the above compositions to a core comprising a thermoplastic elastomer. According to the invention, a resin composition for a skin member, which is capable of producing a laminate exhibiting good sliding properties for a window glass and excellent abrasion resistance and having only a slight amount of a die residue brought about in the extrusion molding, and a laminate using the resin composition can be obtained.

16 Claims, 1 Drawing Sheet

RESIN COMPOSITIONS FOR SKIN MEMBERS AND LAMINATES THEREOF

FIELD OF THE INVENTION

The present invention relates to olefin thermoplastic elastomer compositions for skin members and laminates thereof. More particularly, the invention relates to olefin thermoplastic elastomer compositions for skin members having excellent slide abrasion resistance and extrusion moldability, and also relates to laminates thereof.

BACKGROUND OF THE INVENTION

Olefin thermoplastic elastomers are lightweight, can be easily recycled and generate no noxious gas when they are incinerated, so that they have been intensively used for various materials such as automobile parts, industrial mechanical parts, electronic or electric parts and building materials from the viewpoints of conservation of energy, conservation of resources, and recently, global environmental protection.

An example of the automobile part is a glass run channel. The glass run channel is a guide member provided between a window glass and a window frame, and is required to not only facilitate opening and closing operations of the window glass but also enable the window glass to be shut tightly (fluid-tightly) on the window frame.

Conventional glass run channels comprise a substrate made of a soft synthetic resin (e.g., soft vinyl chloride resin), an ethylene/propylene/diene copolymer rubber or the like and a nylon film for sliding a window glass, said nylon film being laminated to the substrate with an adhesive. In order to decrease the contact area with the window glass, embossing is performed before or after lamination of the nylon film.

Since the process for producing such conventional glass run channels includes a laminating step using an adhesive, the resulting glass run channels have a drawback in that separation between the substrate and the skin layer is liable to occur, and the process is complicated because of many steps.

Under such circumstances, the present inventors have paid attention to the olefin thermoplastic elastomers and tried to solve the problems of the glass run channels. In the use of the olefin thermoplastic elastomer for a single-layer glass run channel, however, the sliding properties for the window glass become bad to cause violent abrasion. Besides, the amount of a die residue brought about in the extrusion molding process is larger than the case of using ordinary resins, and the die residue adheres to the molded article, resulting in bad appearance.

In Japanese Patent Laid-Open Publication No. 176408/1997, it is described that addition of a fatty acid amide to an olefin thermoplastic elastomer enhances sliding properties and abrasion resistance. Even in the use of the thus obtained olefin thermoplastic elastomer composition, however, a problem of occurrence of a die residue in the extrusion molding still remains.

OBJECT OF THE INVENTION

The present invention is intended to solve such problems associated with the prior art as described above, and it is an object of the invention to provide a resin composition for a skin member, which comprises an olefin thermoplastic elastomer and other specific components and which is capable of providing a laminate when it is used for a skin member, said laminate exhibiting good sliding properties for a window glass and excellent abrasion resistance and having only a slight amount of a die residue brought about in the extrusion molding. It is another object of the invention to provide a laminate using the resin composition.

SUMMARY OF THE INVENTION

The first resin composition for a skin member according to the present invention comprises a completely or partially crosslinked olefin thermoplastic elastomer (A) in an amount of 100 parts by weight, an organopolysiloxane (B) having a viscosity (JIS K2283, 25° C.) of not less than $1 \times 10^6$ cSt; preferably $1 \times 10^6$ to $1 \times 10^8$ cSt in an amount of 2 to 20 parts by weight and an organopolysiloxane (C) having a viscosity (JIS K2283, 25° C.) of not less than 10 cSt and less than $1 \times 10^6$ cSt in an amount of 0.5 to 5 parts by weight. In this composition, a polyolefin resin (D) in an amount of 5 to 150 parts by weight and/or a fluoropolymer (E) in an amount of 0.5 to 10 parts by weight may be contained.

The second resin composition for a skin member according to the present invention comprises a completely or partially crosslinked olefin thermoplastic elastomer (A) in an amount of 100 parts by weight and a fluoropolymer (E) in an amount of 0.5 to 10 parts by weight. In this composition, a polyolefin resin (D) may be contained in an amount of 5 to 150 parts by weight.

The fluoropolymer (E) is preferably a hot-melt fluoropolymer, particularly preferably a vinylidene fluoride/hexafluoropropylene copolymer or a tetrafluoroethylene/hexafluoropropylene/vinylidene fluoride copolymer.

The laminate according to the present invention is a laminate formed by laminating a skin member comprising the first or the second resin composition to a core comprising a thermoplastic elastomer.

The above-mentioned compositions are excellent in sliding properties for glasses and abrasion resistance and bring about only a slight amount of a die residue in the extrusion molding process. The term "die residue" used herein means a substance which is different in color or physical properties from the starting material adhered to a die in the extrusion molding of a thermoplastic elastomer. This die residue includes a yellow viscous substance, black fine particles and the like, and is considered to be a deterioration product of the starting polymer. The mechanism of occurrence of the die residue has not been clarified.

DETAILED DESCRIPTION OF THE INVENTION

Figure 1:
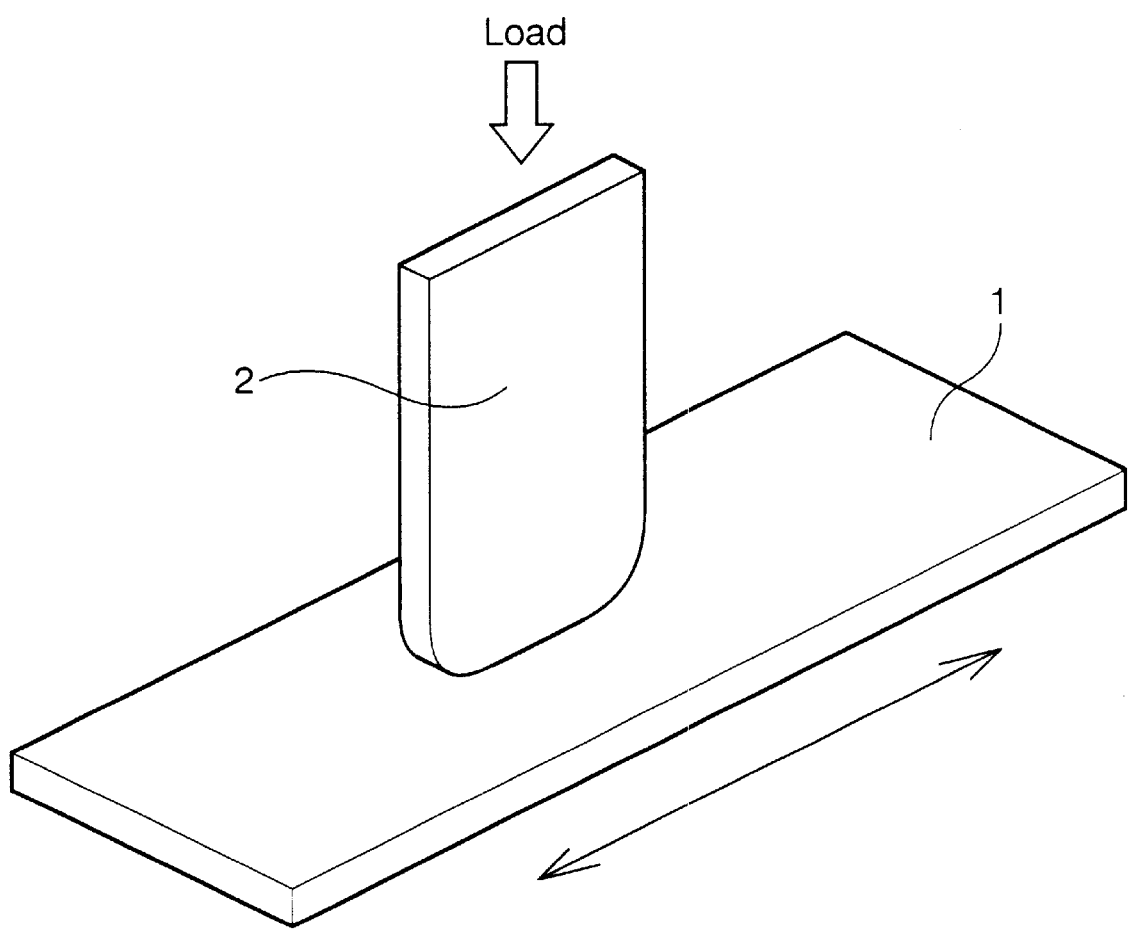
FIG. 1 is a schematic perspective view to illustrate a method of measuring slide abrasion resistance of an injection molded specimen of the resin composition for a skin member according to the present invention.

The resin composition for a skin member according to the present invention and the laminate using the resin composition are described in detail hereinafter.

The first resin composition for a skin member according to the invention is described below.

The first resin composition for a skin member according to the invention comprises an olefin thermoplastic elastomer (A), an organopolysiloxane (B) and an organopolysiloxane (C). This resin composition may further comprise a polyolefin resin (D) and a fluoropolymer (E).

Olefin Thermoplastic Elastomer (A)

The olefin thermoplastic elastomer (A) for use in the invention comprises a crystalline polyolefin and a rubber.

The crystalline polyolefin for use in the invention is a homopolymer or a copolymer of an α-olefin of 2 to 20 carbon atoms.

Particular examples of the crystalline polyolefins: include the following (co)polymers:

(1) an ethylene homopolymer (which may be produced by any of low-pressure and high-pressure processes), (2) a copolymer of ethylene and not more than 10% by mol of another x-olefin or a vinyl monomer such as vinyl acetate or ethyl acrylate, (3) a propylene homopolymer (4) a random copolymer of propylene and not more than 10% by mol of another α-olefin, (5) a block copolymer of propylene and not more than 30% by mol of another α-olefin, (6) a 1-butene homopolymer (7) a random copolymer of 1-butene and not more than 10% by mol of another α-olefin, (8) a 4-methyl-1-pentene homopolymer, and (9) a random copolymer of 4-methyl-1-pentene and not more than 20% by mol of another α-olefin.

Examples of the α-olefins include ethylene, propylene, 1-butene, 4-methyl-1-pentene, 1-hexene and 1-octene.

There is no specific limitation on the rubber employable in the invention, but preferable is an olefin copolymer rubber.

The olefin copolymer rubber is an amorphous, random, elastomeric copolymer containing an α-olefin of 2 to 20 carbon atoms as a major constituent, and is, for example, an amorphous α-olefin copolymer composed of two or more kinds of α-olefins or an α-olefin/non-conjugated diene copolymer composed of two or more kinds of α-olefins and a non-conjugated diene.

Particular examples of the olefin copolymer rubbers include the following rubbers:

(1) an ethylene/α-olefin copolymer rubber (ethylene/α-olefin by mol=about 90/10–50/50), (2) an ethylene/α-olefin/non-conjugated diene copolymer rubber (ethylene/α-olefin by mol about 90/10–50/50), (3) a propylene/α-olefin copolymer rubber (propylene/α-olefin by mol=about 90/10–50/50), and (4) a butene/α-olefin copolymer rubber (butene/α-olefin by mol=about 90/10–50/50).

Examples of the α-olefins include the same α-olefins as used for constituting the crystalline polyolefin.

Examples of the non-conjugated dienes include dicyclopentadiene, 1,4-hexadiene, cyclooctadiene, methylene norbornene and ethylidene norbornene.

The copolymer rubber preferably has a Mooney viscosity $ML_{1+4}(100°\ C.)$ of 10 to 250, particularly preferably 40 to 150. When a non-conjugated diene is copolymerized, the copolymer rubber preferably has an iodine value of not more than 25.

In the thermoplastic elastomer, the olefin copolymer rubber can be present in an uncrosslinked state or in a crosslinked state such as a partially crosslinked state or a completely crosslinked state. In the present invention, however, the olefin copolymer rubber is present preferably in the crosslinked state, particularly preferably in the partially crosslinked state.

The crosslinking agent used for crosslinking the olefin copolymer rubber is, for example, an organic peroxide, a phenol type vulcanizing agent or a silane coupling agent.

Examples of other rubbers than the olefin copolymer rubber, which may be used in the present invention, include diene rubbers, such as styrene/butadiene rubber (SBR), nitrile rubber (NBR), natural rubber (NR) and butyl rubber (IIR), SEBS and polyisobutylene.

In the thermoplastic elastomer for use in the invention, the weight ratio of the crystalline polyolefin to the rubber (crystalline polyolefin/rubber) is in the range of usually 90/10 to 5/95, preferably 70/30 to 10/90.

When the olefin copolymer rubber and other rubbers are used in combination, the other rubbers are added in amounts of not more than 40 parts by weight, preferably 5 to 20 parts by weight, based on 100 parts by weight of the total of the crystalline polyolefin and all rubbers.

The thermoplastic elastomer preferably used in the invention comprises crystalline polypropylene and an ethylene/α-olefin copolymer rubber or an ethylene/α-olefin/non-conjugated diene copolymer rubber. In this thermoplastic elastomer, these components are present in the partially crosslinked state, and the weight ratio of the crystalline polypropylene to the rubber (crystalline polypropylene/rubber) is in the range of 70/30 to 10/90.

To the thermoplastic elastomer, additives, such as mineral oil type softener, heat stabilizer, antistatic agent, weathering stabilizer, anti-aging agent, filler, colorant and lubricant, can be added in amounts not detrimental to the objects of the invention.

A specific example of the thermoplastic elastomer preferably used in the invention is a thermoplastic elastomer obtained by dynamically heat treating, in the presence of an organic peroxide, a phenol type vulcanizing agent or silane coupling agent, a mixture consisting of:

10 to 70 parts by weight of crystalline polypropylene (A-1), 30 to 90 parts by weight of rubber (A-2) comprising an ethylene/propylene copolymer rubber or an ethylene/propylene/diene copolymer rubber, and 5 to 100 parts by weight of a rubber (A-3) other than the rubber (A-2) and/or a mineral oil type softener (A-4), the total amount of said components (A-1) and (A-2) being 100 parts by weight;

wherein the rubber (A-2) is crosslinked.

In the present invention, the organic peroxide is used in an amount of 0.05 to 3% by weight, preferably 0.1 to 1% by weight, based on 100% by weight of the total of the crystalline polyolefin and the rubbers.

In the partially crosslinking treatment with the organic peroxide, a peroxy-crosslinking assistant or a polyfunctional vinyl monomer can be added. By the use of such a compound, a uniform and mild crosslinking reaction can be expected. In the present invention, divinylbenzene is most preferable. Divinylbenzene is easy to handle and has excellent compatibility with the crystalline-polyolefin and the rubber which are major components of the substance to be crosslinked. Further, divinylbenzene has a function of solubilizing the organic peroxide and serves as a dispersant of the organic peroxide. Therefore, the effect of crosslinking by the heat treatment is uniform, and a thermoplastic elastomer well-balanced between flowability and other properties can be obtained.

The crosslinking assistant or the polyfunctional vinyl monomer is desirably used in an amount of 0.1 to 2% by weight, particularly 0.3 to 1% by weight, based on the whole substance to be crosslinked.

The expression "dynamically heat treating" used herein means to knead the components of the thermoplastic elastomer in a molten state.

For the kneading, a conventional kneading device is employed, and examples thereof include open type ones such as a mixing roll and closed type ones such as a Banbury mixer, an extruder, a kneader and a continuous mixer. Of these, preferable is a closed type kneading apparatus. The kneading is carried out in an atmosphere of an inert gas such as a nitrogen gas or a carbonic acid gas.

The thermoplastic elastomer particularly preferably used in the invention is a partially crosslinked thermoplastic elastomer. The expression "partially crosslinked" used herein means that the gel content, as measured by the following method, is in the range of 20 to 98%. In the present invention, it is preferable that the gel content is in the range of 40 to 98%.

Gel Content Measuring Method

About 100 mg of a sample of a thermoplastic elastomer is weighed out and cut into fine pieces each having a size of 0.5 mm×0.5 mm×0.5 mm. The fine pieces are immersed in 30 ml of cyclohexane at 23° C. for 48 hours in a closed vessel.

Then, the sample is taken out on a filter paper and dried at room temperature for 72 hours or more until a constant weight is reached.

From the weight of the dry residue, the weight of cyclohexane-insoluble components (e.g., fibrous filler, filler, pigment) other than the polymer components is subtracted, and the obtained value is taken as a "corrected final value (Y)".

On the other hand, a value obtained by subtracting the weight of cyclohexane-soluble components (e.g., softener) other than the polymer components and the weight of cyclohexane-insoluble components (e.g., fibrous filler, filler, pigment) other than the polymer components from the weight of the sample is taken as a "corrected initial value (X)".

The gel content (content of cyclohexane-insoluble components) is calculated from the following formula.

Gel content (% by weight)=[Corrected final value (*Y*)]÷[Corrected initial value (*X*)]×100

The thermoplastic elastomer (A) that is a constituent of one layer of the thermoplastic elastomer laminate of the invention comprises the crystalline polyolefin and the rubber, so that it has excellent flowability.

The polyolefin thermoplastic elastomer mentioned above can be molded using conventional molding devices such as a compression molding machine, a transfer molding machine, an injection molding machine and an extrusion molding machine.

Organopolysiloxanes (B) and (C)

Examples of the organopolysiloxanes (B) and (C) for use in the invention include dimethylpolysiloxane, methylphenylpolysiloxane, fluoropolysiloxane, tetramethyltetraphenylpolysiloxane, methylhydrogenpolysiloxane, and modified polysiloxanes such as epoxy-modified, alkyl-modified, amino-modified, carboxyl-modified, alcohol-modified, fluorine-modified, alkylaralkyl polyether-modified and epoxy polyether-modified polysiloxanes. Of these, dimethylpolysiloxane is preferably employed.

The organopolysiloxane (B) has a viscosity (JIS K2283, 25° C.) of not less than 1,000,000 cSt, preferably $1 \times 10^6$ to $1 \times 10^8$ cSt, more preferably $1 \times 10^6$ to $1 \times 10^7$ cSt.

Since the viscosity of the organopolysiloxane (B) used herein is extremely high, a masterbatch thereof with an olefin resin may be used in order to enhance dispersibility of the organopolysiloxane (B) in the olefin thermoplastic elastomer.

The organopolysiloxane (B) is used in an amount of 2 to 20 parts by weight, preferably 2 to 15 parts by weight, based on 100 parts by weight of the olefin thermoplastic elastomer (A).

The organopolysiloxane (C) has a viscosity (JIS K2283, 25° C.) of not less than 10 cSt and less than 1,000,000 cSt, preferably 100 cSt to 100,000 cSt.

When the viscosity of the organopolysiloxane (C) is less than 10 cSt, the organopolysiloxane (C) is liable to be deposited on a surface of the resulting molded article, and the molded article sometimes has a defect of sticky surface.

The organopolysiloxane (C) is used in an amount of 0.5 to 5 parts by weight, based on 100 parts by weight of the olefin thermoplastic elastomer (A).

Use of the organopolysiloxane (B) having a viscosity of not less than 1,000,000 cSt alone as the organopolysiloxane component sometimes causes a die residue in the molding process.

Polyolefin Resin (D)

The polyolefin resin (D) for use in the invention is preferably the crystalline polyolefin used for the aforesaid polyolefin thermoplastic elastomer (A).

Another example of the polyolefin resin (D) preferably used in the invention is a polyolefin having an intrinsic viscosity (η), as measured in decalin at 135° C., of 3.5 to 8.3 dl/g. Such a polyolefin may consist of one kind of a polyolefin or may be a composition or mixture comprising two or more kinds of polyolefins having different intrinsic viscosities, but preferable is a polyolefin composition comprising a ultra-high-molecular weight polyolefin and a low-molecular weight to high-molecular weight polyolefin. More preferable is a polyolefin composition having an intrinsic viscosity (η), as measured in decalin at 135° C., of 3.5 to 8.3 dl/g, which essentially consists of a ultra-high-molecular weight polyolefin having an intrinsic viscosity (η), as measured in decalin at 135° C., of 7 to 40 dl/g, preferably 10 to 35 dl/g, and a low-molecular weight to high-molecular weight polyolefin having an intrinsic viscosity (η), as measured in decalin at 135° C., of 0.1 to 5 dl/g, preferably 0.1 to 2 dl/g, and in which the ultra-high-molecular weight polyolefin is present in an amount of 15 to 40% by weight, preferably 18 to 35% by weight, based on 100% by weight of the total of the ultra-high-molecular weight polyolefin and the low-molecular weight to high-molecular weight polyolefin.

The ultra-high-molecular weight polyolefin and the low-molecular weight to high-molecular weight Polyolefin are each a homopolymer or a copolymer of an α-olefin such as ethylene, propylene, 1-butene, 1-pentene, 1-hexene, 1-octene, 1-decene, 1-dodecene, 4-methyl-1-pentene or 3-methyl-1-pentene. In the present invention, an ethylene homopolymer or a copolymer comprising ethylene (major constituent) and another α-olefin is preferable.

The polyolefins previously described as preferred examples can be used in combination of two or more kinds as the polyolefin resin (D) for use in the invention. For example, it is preferable that the crystalline polyolefin for the polyolefin thermoplastic elastomer (A) and the polyolefin having an intrinsic viscosity (η), as measured in decalin at 135° C., of 3.5 to 8.3 dl/g are used in combination.

The polyolefin resin (D) is used in an amount of 5 to 150 parts by weight, preferably 10 to 100 parts by weight, based on 100 parts by weight of the olefin thermoplastic elastomer (A).

Fluoropolymer (E)

In the present invention, a fluoropolymer (E) can be further added to the resin composition for a skin member. The fluoropolymer (E) has a molecular weight of usually $1 \times 10^4$ to $1 \times 10^8$, preferably $1 \times 10^5$ to $1 \times 10^7$.

Examples of the fluoropolymers (E) include a polytetrafluoroethylene, a tetrafluoroethylene/hexafluoropropylene copolymer, a tetrafluoroethylene/perfluorovinyl ether copolymer, a tetrafluoroethylene/ethylene copolymer, a vinylidene fluoride polymer, a vinylidene fluoride/hexafluoropropylene copolymer, a tetrafluoroethylene/hexafluoropropylene/vinylidene fluoride copolymer and a vinyl fluoride polymer. Of these, the vinylidene fluoride/hexafluoropropylene copolymer and the tetrafluoroethylene/hexafluoropropylene/vinylidene fluoride copolymer are preferable.

When the vinylidene fluoride/hexafluoropropylene copolymer or the tetrafluoroethylene/hexafluoropropylene/vinylidene fluoride copolymer is used, a skin member having only a slight amount of a die residue can be obtained.

To enhance dispersibility of the fluoropolymer (E) in the olefin thermoplastic elastomer or to further improve the slide abrasion resistance, a masterbatch of the fluoropolymer (E) with an olefin resin and/or a known inorganic filler may be used.

The fluoropolymer (E) is used in an amount of 0.5 to 10 parts by weight, preferably 0.5 to 7 parts by weight, based on 100 parts by weight of the olefin thermoplastic elastomer (A).

The resin composition of the invention can be obtained by dynamically heat treating a mixture consisting of the olefin thermoplastic elastomer (A), the organopolysiloxane (B) having a viscosity of not less than 1,000,000 cSt, the organopolysiloxane (C) having a viscosity of not less than 10 cSt and less than 1,000,000 cSt, and optionally, the polyolefin resin (D) and the fluoropolymer (E), in a manner similar to that for obtaining the aforesaid olefin thermoplastic elastomer (A).

To the resin composition, additives, such as mineral oil type softener, heat stabilizer, antistatic agent, weathering stabilizer, anti-aging agent, filler, colorant and lubricant, can be added in amounts not detrimental to the objects of the invention.

Next, the second resin composition for a skin member according to the invention is described.

The second resin composition for a skin member according to the invention comprises an olefin thermoplastic elastomer (A) and a fluoropolymer (E). This resin composition may further comprise a polyolefin resin (D).

Olefin Thermoplastic Elastomer (A)

The olefin thermoplastic elastomer (A) for use in the invention comprises a crystalline polyolefin and a rubber, and is identical with the aforesaid olefin thermoplastic elastomer (A) that is a constituent of the first resin composition for a skin member according to the invention.

Fluoropolymer (E)

The fluoropolymer (E) for use in the invention is identical with the aforesaid fluoropolymer (E) that is optionally used in the first resin composition for a skin member according to the invention.

To enhance dispersibility of the fluoropolymer (E) in the olefin thermoplastic elastomer or to further improve the slide abrasion resistance, a masterbatch of the fluoropolymer (E) with an olefin resin and/or a known inorganic filler may be used.

The fluoropolymer (E) is used in an amount of 0.5 to 10 parts by weight, preferably 0.5 to 7 parts by weight, based on 100 parts by weight of the olefin thermoplastic elastomer (A).

Polyolefin Resin (D)

The polyolefin resin (D) for use in the invention is identical with the aforesaid polyolefin resin (D) that is optionally used in the first resin composition for a skin member according to the invention.

The polyolefin resin (D) is used in an amount of 5 to 150 parts by weight, preferably 10 to 100 parts by weight, based on 100 parts by weight of the olefin thermoplastic elastomer (A).

To the resin composition, additives, such as mineral oil type softener, heat stabilizer, antistatic agent, weathering stabilizer, anti-aging agent, filler, colorant and lubricant, can be added in amounts not detrimental to the objects of the invention.

Next, the laminate according to the invention is described.

The laminate according to the invention is obtained by laminating a skin member comprising the resin composition described above to a core comprising a thermoplastic elastomer. The laminating method varies depending on the shape and size of the final article and the property requirements therefor, and is not specifically limited. For example, a core and a skin member are formed and fusion bonded by simultaneous extrusion molding using a multi-layer extrusion molding machine. This fusion bonding method needs no adhesive and can provide a laminate through one simple step. Besides, the interlaminar strength between the core and the skin member is high.

The thermoplastic elastomer laminate is favorable for automobile parts, specifically, glass run channels, window moles and side moles.

EFFECT OF THE INVENTION

According to the present invention, there can be obtained a resin composition for a skin member, which is capable of producing a laminate having only a slight amount of a die residue brought about in the extrusion molding and exhibiting good appearance, with keeping good sliding properties for a window glass and excellent abrasion resistance. Further, a laminate using the resin composition can also be obtained.

EXAMPLE

The present invention is further described with reference to the following examples, but it should be construed that the invention is in no way limited to those examples.

Examples 1–9

65 Parts by weight of an ethylene/propylene/5-ethylidene-2-norbornene copolymer rubber having an ethylene content of 70% by mol. an iodine value of 12 and a Mooney viscosity $ML_{1+4}(100°$ C.) of 120 and 35 parts by weight of polypropylene having MFR (ASTM D 1238-65T, 230° C.) of 13 g/10 min and a density of 0.91 g/cm³ were kneaded by a Banbury mixer at 180° C. for 5 minutes in a nitrogen atmosphere. Then, the kneadate was passed through rolls to give a sheet, and the sheet was cut by a sheet cutter to prepare square pellets.

Then, the square pellets, 0.2 part by weight of 1,3-bis (tert-butylperoxyisopropyl)benzene and 0.2 part by weight of divinylbenzene were mixed and stirred by a Henschel mixer.

The mixture was extruded by a twin-screw extruder (L/D=40, screw diameter: 50 mm) at 220° C. in a nitrogen atmosphere to obtain an olefin thermoplastic elastomer (a).

The gel content in the olefin thermoplastic elastomer (a) was measured by the aforesaid method. As a result, the gel content was 78% by weight.

Subsequently, the olefin thermoplastic elastomer (a) and the following starting materials were kneaded in the ratio shown in Table 1 by means of a twin-screw extruder to obtain pellets of a resin composition.

Organopolysiloxane (b)

Silicone oil polypropylene masterbatch BY27-002 (content of ultra-high-molecular weight silicone oil: 50% by weight, type of silicone oil: dimethylpolysiloxane), available from Toray Dow Corning Silicone, Ltd.

Organopolysiloxane (c)

Silicone oil SH200 (3000 cSt, type of silicone oil: dimethylpolysiloxane), available from Toray Dow Corning Silicone, Ltd.

Polyolefin Resin (d-1)

Polypropylene resin (MFR (ASTM D 1238-65T, 230° C.): 13 g/10 min, density: 0.91 g/cm$^3$)

Polyolefin Resin (d-2)

Polyethylene composition (intrinsic viscosity ($\eta$) measured in decalin at 135° C.: 7.0 dl/g) consisting of 23% by weight of ultra-high-molecular weight polyethylene (intrinsic viscosity ($\eta$) measured in decalin at 135° C.: 28 dl/g) and 77% by weight of low-molecular weight polyethylene (intrinsic viscosity ($\eta$) measured in decalin at 135° C.: 0.73 dl/g)

Fluoropolymer (e)

Dynamar FX-9613 (content of fluoropolymer: 90%, type of fluoropolymer: vinylidene fluoride/hexafluoropropylene copolymer), available from Sumitomo 3M, Ltd.

The pellets of the resin composition were subjected to injection molding to obtain a specimen of 150 mm×120 mm×3 mm. The coefficient of friction and the slide abrasion resistance of the specimen were evaluated by the following methods. The results are set forth in Table 1.

Coefficient of Friction

The coefficient of dynamic friction and coefficient of static friction of the specimen with a glass were measured under a load of 200 g in accordance with ASTM D1894-75.

Slide Abrasion Resistance

As shown in FIG. 1, an abrading glass 2 (width: 20 mm, height: 30 mm, thickness 4.5 mm) was brought into contact with a surface of the injection molded specimen 1 of the resin composition. Then, a load of 3 kg was applied to the abrading glass 2 in a slide abrasion tester, and a slide test was carried out in abrasion cycles of 10,000 at a stroke of 100 mm to measure a depth ($\mu$m) of abrasion.

Separately, using a single-screw extruder having a full-flighted screw (screw diameter: 50 mm, L/D: 28, compression ratio: 4.0) and using a die (aperture: 25 mm×1 mm) equipped on the extruder, the pellets of the resin composition were extruded at a rate of 12 kg/hr for 30 to 90 minutes under the condition of gradient temperature rise of 160 to 210° C. (from feed zone of extruder to die opening), to produce a molded article in the form of a tape. The die residue was weighed. The amount of the die residue was expressed in terms of a weight given when 1 ton of the pellets were extruded. The results are set forth in Table 1.

Gradient Temperature Rise

Preset temperatures of zones (C1–C4), head (H) and die (D): C1/C2/C3/C4/H/D=160/170/180/190/200/210 (° C.)

Comparative Examples 1–4

Preparation of a resin composition and molding thereof were carried out in the same manner as in Example 1, except that the olefin thermoplastic elastomer (a), the organopolysiloxane (b) and the organopolysiloxane (c) were used in the ratio shown in Table 1. Then, the coefficient of friction, slide abrasion resistance and amount of the die residue were evaluated. In Comparative Example 4, the organopolysiloxane (b) was not used.

TABLE 1

| | Ex. 1 | Ex. 2 | Ex. 3 | Ex. 4 | Ex. 5 | Ex. 6 | Ex. 7 | Ex. 8 | Ex. 9 | Comp Ex. 1 | Comp Ex. 2 | Comp Ex. 3 | Comp Ex. 4 |
|---|---|---|---|---|---|---|---|---|---|---|---|---|---|
| Resin composition (parts by wt.) | | | | | | | | | | | | | |
| (a) | 100 | 100 | 100 | 100 | 100 | 100 | 100 | 100 | 100 | 100 | 100 | 100 | 100 |
| (b) | 14 | 5 | 18 | 14 | 14 | 14 | 4 | 14 | 14 | 50 | 14 | 14 | — |
| (silicon oil content in (b)) | (7) | (2.5) | (9) | (7) | (7) | (7) | (7) | (7) | (7) | (25) | (7) | (7) | — |
| (c) | 2 | 2 | 2 | 1 | 4 | 2 | 2 | 2 | 2 | 2 | 0.1 | — | 2 |
| (d-1) | | | | | | 30 | | 20 | | | | | |
| (d-2) | | | | | | | 20 | 15 | | | | | |
| Oleamide | | | | | | | | | 3 | | | | |
| Fluoropolymer (e) | | | | | | | | | (2.7) | | | | |
| (fluorine content in fluoropolymer) | | | | | | | | | | | | | |
| Results of evaluation | | | | | | | | | | | | | |
| Coefficient of dynamic friction | 0.38 | 0.41 | 0.35 | 0.42 | 0.36 | 0.29 | 0.29 | 0.27 | 0.28 | 0.27 | 0.50 | 0.40 | 0.56 |
| Coefficient of static friction | 0.26 | 0.29 | 0.25 | 0.30 | 0.25 | 0.22 | 0.22 | 0.20 | 0.21 | 0.20 | 0.45 | 0.28 | 0.52 |
| Depth of abrasion ($\mu$m) | 150 | 250 | 100 | 250 | 100 | 50 | 50 | 50 | 90 | 50 | 400 | 160 | 550 |
| Amount of die residue (g/ton) | 0.5 | 0.1 | 0.8 | 0.5 | 0.4 | 0.8 | 0.9 | 0.2 | 0.5 | 13 | 9 | 11 | 1 |

The resin compositions of the above-mentioned examples and comparative examples were those containing 0.1 part by weight of a heat stabilizer, 0.2 part by weight of a weathering stabilizer (ultraviolet light absorber) and 0.1 part by weight of a weathering stabilizer (light stabilizer).

Examples 10–16

The olefin thermoplastic elastomer (a) used in Example 1 and the following starting materials were kneaded in the ratio shown in Table 2 by means of a twin-screw extruder to obtain pellets of a resin composition.

Fluoropolymer (e)

Dynamar FX-9613 (content of fluoropolymer: 90%, type of fluoropolymer: vinylidene fluoride/hexafluoropropylene copolymer), available from Sumitomo 3M, Ltd.

Polyolefin Resin (d-1)

Polypropylene resin (MFR (ASTM D 1238-65T, 230° C.): 13 g/10 min, density: 0.91 g/cm$^3$)

Polyolefin Resin (d-2)

Polyethylene composition (intrinsic viscosity ($\eta$) measured in decalin at 135° C.: 7.0 dl/g) consisting of 23% by weight of ultra-high-molecular weight polyethylene (intrinsic viscosity ($\eta$) measured in decalin at 135° C.: 28 dl/g) and 77% by weight of low-molecular weight polyethylene (intrinsic viscosity ($\eta$) measured in decalin at 135° C.: 0.73 dl/g)

Comparative Examples 5 and 6

Preparation of a resin composition and molding thereof were carried out in the same manner as in Example 10, except that the olefin thermoplastic elastomer (a) and the polyolefin resin (d-1) were used and that oleamide was used in the amount shown in Table 2 in place of the fluoropolymer (e). Then, the coefficient of friction, slide abrasion resistance and amount of the die residue were evaluated. The results are set forth in Table 2.

Comparative Example 7

Preparation of a resin composition and molding thereof were carried out in the same manner as in Example 10, except that the olefin thermoplastic elastomer (a) and the fluoropolymer (e) were used in the ratio shown in Table 2. Then, the coefficient of friction, slide abrasion resistance and amount of the die residue were evaluated. The results are set forth in Table 2.

TABLE 2

| | Ex. 10 | Ex. 11 | Ex. 12 | Ex. 13 | Ex. 14 | Ex. 15 | Ex. 16 | Comp. Ex. 5 | Comp. Ex. 6 | Comp. Ex. 7 |
|---|---|---|---|---|---|---|---|---|---|---|
| Resin composition (parts by wt.) | | | | | | | | | | |
| (a) | 100 | 100 | 100 | 100 | 100 | 100 | 100 | 100 | 100 | 100 |
| (e) | 3 | 1 | 5 | 10 | 3 | 3 | 3 | | | 20 |
| fluorine polymer content in (e) | | | | | | | | | | |
| (d-1) | (2.7) | (0.9) | (0.45) | (9) | (2.7) | (2.7) | (2.7) | | | (18) |
| (d-2) | | | | | 30 | | 20 | | 30 | |
| Oleamide | | | | | | 20 | 15 | 4 | 4 | |
| Results of evaluation | | | | | | | | | | |
| Coefficient of dynamic friction | 0.38 | 0.41 | 0.35 | 0.27 | 0.29 | 0.29 | 0.27 | 0.38 | 0.30 | 0.26 |
| Coefficient of static friction | 0.26 | 0.29 | 0.25 | 0.20 | 0.22 | 0.22 | 0.20 | 0.26 | 0.23 | 0.20 |
| Depth of abrasion ($\mu$m) | 150 | 250 | 100 | 50 | 50 | 50 | 50 | 150 | 70 | 50 |
| Amount of die residue (g/ton) | 0.1 | 1.8 | 1.2 | 4.9 | 1.0 | 0.6 | 0.1 | 25 | 18 | 13 |

The pellets of the resin composition were subjected to injection molding to obtain a specimen of 150 mm×120 mm×3 mm. The coefficient of friction and the slide abrasion resistance of the specimen were evaluated by the aforesaid methods. The results are set forth in Table 2.

Separately, using a single-screw extruder having a full-flighted screw (screw diameter: 50 mm, L/D: 28, compression ratio: 4.0) and using a die (aperture of 25 mm×1 mm) equipped on the extruder, the pellets of the resin composition were extruded at a rate of 12 kg/hr for 30 to 90 minutes under the condition of gradient temperature rise of 160 to 210° C. (from feed zone of extruder to die opening), to produce a molded article in the form of a tape. The die residue was weighed. The amount of the die residue was expressed in terms of a weight given when 1 ton of the pellets were extruded. The results are set forth in Table 2.

Gradient Temperature Rise

Preset temperatures of zones (C1–C4), head (H) and die (D): C1/C2/C3/C4/H/D=160/170/180/190/200/210(° C.)

The resin compositions of the above-mentioned examples 10–16 and comparative examples 5–7 were those containing 0.1 part by weight of a heat stabilizer, 0.2 part by weight of a weathering stabilizer (ultraviolet light absorber) and 0.1 part by weight of a weathering stabilizer (light stabilizer).

What is claimed is:

1. A resin composition for a skin member, comprising a completely or partially crosslinked olefin thermoplastic elastomer (A) comprising a crystalline polyolefin and a rubber in an amount of 100 parts by weight, an organopolysiloxane (B) having a viscosity (JIS K2283, 25° C.) of not less than 1×10$^6$ cSt in an amount of 2 to 20 parts by weight and an organopolysiloxane (C) having a viscosity (JIS K2283, 25° C.) of not less than 10 cSt and less than 1×10$^6$ cSt in an amount of 0.5 to 5 parts by weight.

2. A resin composition for a skin member, comprising a completely or partially crosslinked olefin thermoplastic elastomer (A) in an amount of 100 parts by weight, an organopolysiloxane (B) having a viscosity (JIS K2283, 25° C.) of not less than $1\times10^6$ cSt in an amount of 2 to 20 parts by weight, an organopolysiloxane (c) having a viscosity (JIS K2283, 25° C.) of not less than 10 cSt and less than $1\times10^6$ cSt in an amount of 0.5 to 5 parts by weight and a polyolefin resin (D) in an amount of 5 to 150 parts by weight.

3. The resin composition for a skin member as claimed in claim 1 or 2 wherein the viscosity of the organopolysiloxane (B) is $1\times10^6$ to $1\times10^8$ cSt.

4. The resin composition for a skin member as claimed in claim 2, further comprising a fluoropolymer (E).

5. A laminate formed by laminating a skin member comprising the resin composition as claimed in claim 1 or 2 to a core comprising a thermoplastic elastomer.

6. A resin composition for a skin member, comprising a completely or partially crosslinked olefin thermoplastic elastomer (A) comprising a crystalline polyolefin and a rubber in an amount of 100 parts by weight and a fluoropolymer (E) in an amount of 0.5 to 10 parts by weight, wherein the fluoropolymer (E) is a vinylidene fluoride/hexafluoropropylene copolymer or a tetrafluoroethylene/hexafluoropropylene/vinylidene fluoride copolymer.

7. A resin composition for a skin member, comprising a completely or partially crosslinked olefin thermoplastic elastomer (A) comprising a crystalline polyolefin and a rubber in an amount of 100 parts by weight, a fluoropolymer (E) in an amount of 0.5 to 10 parts by weight and a polyolefin resin (D) in an amount of 5 to 150 parts by weight, wherein the fluoropolymer (E) is a vinylidene fluoride/hexafluoropropylene copolymer or a tetrafluoroethylene/hexafluoropropylene/vinylidene fluoride copolymer.

8. The resin composition for a skin member as claimed in claim 6 or 7, wherein the fluoropolymer (E) is a hot-melt fluoropolymer.

9. A laminate formed by laminating a skin member comprising the resin composition as claimed in claim 6 or 7 to a core comprising a thermoplastic elastomer.

10. A resin composition for a skin member, comprising a completely or partially crosslinked olefin thermoplastic elastomer (A) comprising a weight ratio of crystalline polyolefin to olefin copolymer rubber of 70/30 to 10/90 in an amount of 100 parts by weight, an organopolysiloxane (B) having a viscosity (JIS K2283, 25° C.) of not less than $1\times10^6$ cSt in an amount of 2 to 20 parts by weight and an organopolysiloxane (C) having a viscosity (JIS K2283, 25° C.) of not less than 10 cSt and less than $1\times10^6$ cSt in an amount of 0.5 to 5 parts by weight.

11. The resin composition for a skin member as claimed in claim 10 wherein the viscosity of the organopolysiloxane (B) is $1\times10^6$ to $1\times10^8$ cSt.

12. The resin composition for a skin member as claimed in claim 10, further comprising a fluoropolymer (E).

13. A resin composition for a skin member, comprising a completely or partially crosslinked olefin thermoplastic elastomer (A) in an amount of 100 parts by weight, an organopolysiloxane (B) having a viscosity (JIS K2283, 25° C.) of not less than $1\times10^6$ cSt in an amount of 2 to 20 parts by weight and an organopolysiloxane (C) having a viscosity (JIS K2283, 25° C.) of not less than 10 cSt and less than $1\times10^6$ cSt in an amount of 0.5 to 5 parts by weight, and a fluoropolymer (E).

14. The resin composition for a skin member as claimed in claim 13 wherein the viscosity of the organopolysiloxane (B) is $1\times10^6$ to $1\times10^8$ cSt.

15. A resin composition for a skin member, comprising a completely or partially crosslinked olefin thermoplastic elastomer (A) comprising a weight ratio of crystalline polyolefin to olefin copolymer rubber of 70/30 to 10/90 in an amount of 100 parts by weight and a fluoropolymer (E) in an amount of 0.5 to 7 parts by weight, wherein the fluoropolymer (E) is a vinylidene fluoride/hexafluoropropylene copolymer or a tetrafluoroethylene/hexafluoropropylene/vinylidene fluoride copolymer.

16. A resin composition for a skin member, comprising a completely or partially crosslinked olefin thermoplastic elastomer (A) comprising a weight ratio of crystalline polyolefin to olefin copolymer rubber of 70/30 to 10/90 in an amount of 100 parts by weight, a fluoropolymer (E) in an amount of 0.5 to 7 parts by weight and a polyolefin resin (D) in an amount of 5 to 150 parts by weight, wherein the fluoropolymer (E) is a vinylidene fluoride/hexafluoropropylene copolymer or a tetrafluoroethylene/hexafluoropropylene/vinylidene fluoride copolymer.

* * * * *